Patented July 1, 1930

1,768,970

UNITED STATES PATENT OFFICE

LOUIS ANNÉE, OF DETROIT, MICHIGAN, ASSIGNOR OF ONE-HALF TO RICHARD GAUL, OF MILFORD, MICHIGAN

POLISHING AND CLEANING COMPOSITION

No Drawing.   Application filed May 9, 1929.   Serial No. 361,843.

My invention relates to a new and useful improvement in a polishing and cleaning composition and has for its object the provision of a composition which may be used for polishing and cleaning metal, woodwork, glass and finished surfaces and which may be quite efficient in use, economical to manufacture and easily and quickly applied.

Other objects will appear hereinafter.

The invention consists in substantially the proportions set out of the following ingredients, to-wit:

| | |
|---|---|
| Kerosene | 8 parts. |
| Vinegar | 1 part. |
| Onion water | 52 parts. |
| Whiting | 8 parts. |

In mixing the composition, it is preferred to use onion water which is formed by boiling six large onions in one gallon of water until all of the juices of the onions have been boiled therefrom.

The water is poured upon the whiting after which the kerosene and vinegar are added to the composition in the order set out.

In applying the composition, the same may be applied to the surfaces to be polished and cleaned by a rag. The composition is thoroughly rubbed over the surfaces after which it is removed by a dry cloth, the composition serving to clean and polish at the same.

While I have illustrated and described the preferred form of my invention, I wish to embrace by the appended claim such variations and modifications as may come within the scope of the appended claim.

What I claim is:

A cleaning and polishing composition consisting of the following ingredients in substantially the following proportions, to-wit: kerosene, 8 parts; vinegar, 1 part, onion water, 52 parts; whiting, 8 parts.

In testimony whereof I have signed the foregoing specification.

LOUIS ANNÉE.